(12) United States Patent
Karolus et al.

(10) Patent No.: US 12,421,056 B2
(45) Date of Patent: Sep. 23, 2025

(54) TRANSPORT SYSTEM AND METHOD FOR OPERATING A TRANSPORT SYSTEM WITH COLLISION MONITORING

(71) Applicant: B & R INDUSTRIAL AUTOMATION GMBH, Eggelsberg (AT)

(72) Inventors: Christina Karolus, Eggelsberg (AT); Benjamin Reichenwallner, Eggelsberg (AT)

(73) Assignee: ABB SCHWEIZ AG, Baden (CH)

( * ) Notice: Subject to any disclaimer, the term of this patent is extended or adjusted under 35 U.S.C. 154(b) by 718 days.

(21) Appl. No.: 17/826,584

(22) Filed: May 27, 2022

(65) Prior Publication Data

US 2022/0380148 A1    Dec. 1, 2022

(30) Foreign Application Priority Data

May 31, 2021    (AT) ............... A 50435/2021

(51) Int. Cl.
  *B65G 54/02*    (2006.01)
  *B60L 3/00*    (2019.01)
  (Continued)

(52) U.S. Cl.
  CPC ............ *B65G 54/02* (2013.01); *B60L 3/0015* (2013.01); *B60L 13/03* (2013.01); *G05D 1/0289* (2013.01);
  (Continued)

(58) Field of Classification Search
  CPC ..... B65G 54/02; G05D 1/0289; B60L 3/0015; B60L 13/03; B60L 15/005; B60L 15/38
  See application file for complete search history.

(56) References Cited

U.S. PATENT DOCUMENTS 9,958,852 B2    5/2018    Bhatt et al.
10,220,862 B2    3/2019    Huber et al.
(Continued)

FOREIGN PATENT DOCUMENTS

EP    3 196 719    7/2017
EP    3 202 612    8/2017
(Continued)

OTHER PUBLICATIONS

Austria Search Report conducted in counterpart Austria Patent Application No. A 50435/2021 (Mar. 17, 2022).
(Continued)

*Primary Examiner* — James R Bidwell
(74) *Attorney, Agent, or Firm* — GREENBLUM & BERNSTEIN, P.L.C.

(57) ABSTRACT

To allow a movement limit or a dimension of a mover to be changed safely in a transport system in the form of a long-stator linear motor during operation of the transport system, a method provided that, during operation of the transport system, a new movement limit or a new dimension is predetermined for a first transport unit, and it is checked whether the new movement limit or the new dimension results in a risk of collision with another, adjacent transport unit or a barrier of the transport system due to the predetermined collision logic, and, if no risk of collision is recognized, the new movement limit is used in the collision logic as a collision movement limit for the first transport unit or the new dimension is used in the collision logic as a collision dimension of the first transport unit.

8 Claims, 1 Drawing Sheet

(51) Int. Cl.
*B60L 13/03* (2006.01)
*B60L 15/38* (2006.01)
*G05D 1/00* (2024.01)

(52) U.S. Cl.
CPC ....... *B60L 15/38* (2013.01); *B65G 2203/0283* (2013.01)

(56) References Cited

U.S. PATENT DOCUMENTS

| | | | |
|---|---|---|---|
| 10,994,943 B2 | 5/2021 | Huber et al. | |
| 11,599,101 B2* | 3/2023 | Huang | G05B 19/416 |
| 2017/0217460 A1* | 8/2017 | Huber | B60L 13/03 |
| 2020/0031591 A1 | 1/2020 | Huber et al. | |
| 2020/0036276 A1* | 1/2020 | Huber | B60L 13/03 |
| 2020/0171953 A1 | 6/2020 | Huang et al. | |
| 2022/0356902 A1* | 11/2022 | Gardner | F16C 29/123 |

FOREIGN PATENT DOCUMENTS

| | | | |
|---|---|---|---|
| EP | 3 582 376 | 12/2019 | |
| EP | 3 599 127 | 1/2020 | |
| EP | 3620879 A1 * | 3/2020 | B65G 43/00 |

OTHER PUBLICATIONS

Europe Search Report/Office Action conducted in counterpart Europe Appln. No. EP 22175815 (Oct. 26, 2022).

* cited by examiner

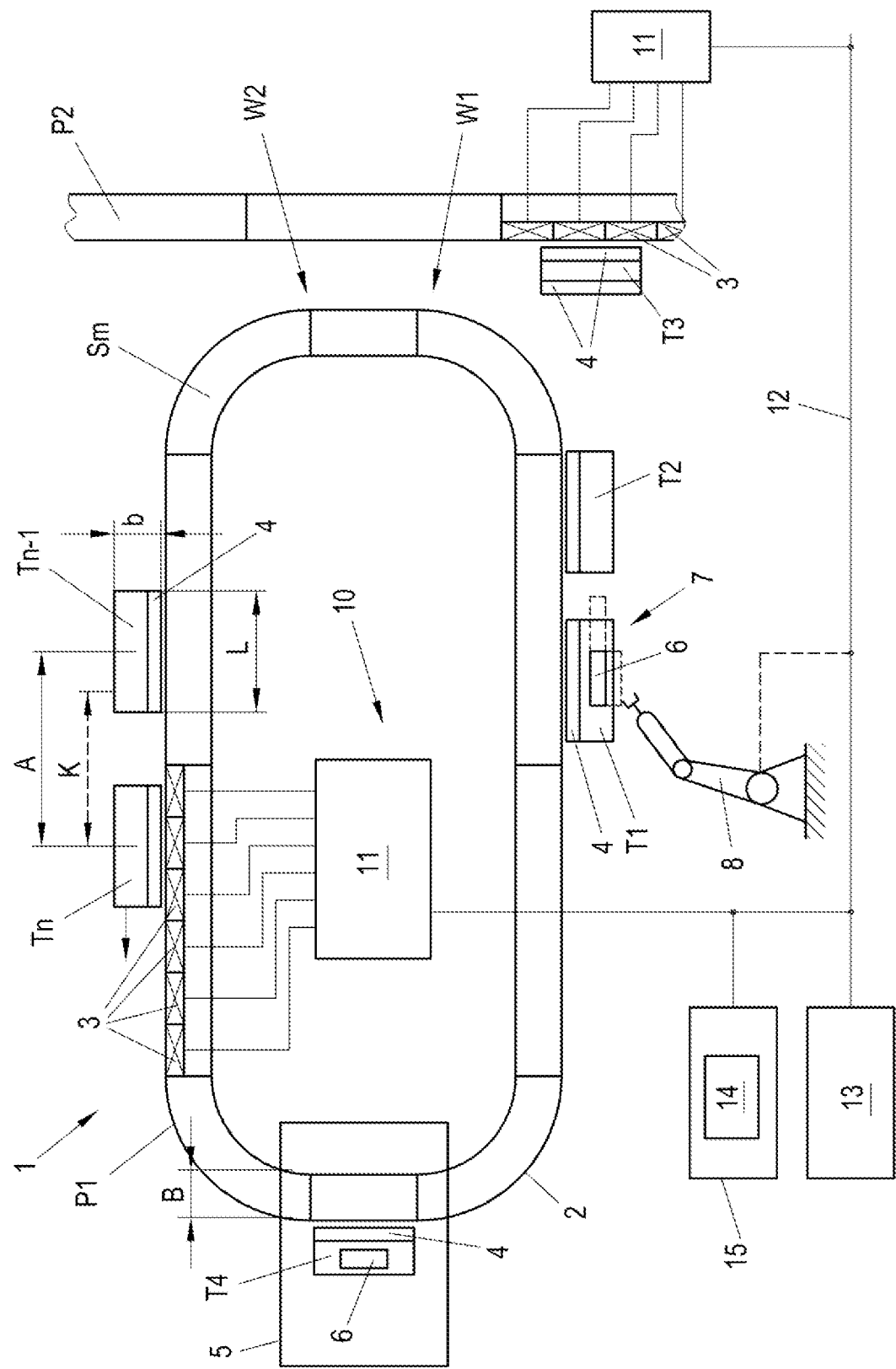

TRANSPORT SYSTEM AND METHOD FOR OPERATING A TRANSPORT SYSTEM WITH COLLISION MONITORING

CROSS-REFERENCE TO RELATED APPLICATION

This application claims the priority under 35 U.S.C. § 119(a) of Austria Application No. A50435/2021 filed May 31, 2021, the disclosure of which is expressly incorporated by reference herein in its entirety.

BACKGROUND

1. Field of the Invention

Embodiments relate to a method for operating a transport system in the form of a long-stator linear motor having a plurality of transport units, wherein, during operation of the transport system, a predetermined collision logic continuously monitors that a distance between adjacent transport units or between a transport unit and a barrier is sufficiently large, so that, taking into account predetermined collision movement limits and predetermined collision dimensions of the transport units or the transport unit, a collision between the adjacent transport units or the transport unit and the barrier can be prevented. Embodiments also relate to a transport system in the form of a long-stator linear motor having plurality of transport units and having a system control unit which controls the movements of the transport units, wherein a collision control unit is provided which, during operation of the transport system, continuously monitors with a predetermined collision logic that a distance between adjacent transport units or between a transport unit and a barrier is sufficiently large, so that, taking into account predetermined collision movement limits and predetermined collision dimensions of the transport units or the transport unit, a collision between the adjacent transport units or the transport unit and the barrier can be prevented.

2. Discussion of Background Information

In a linear motor, a primary part (stator) is provided and a secondary part (mover) is provided which is arranged so as to be movable relative to the primary part. Magnetic-field-generating units are arranged on the primary part and excitation magnets are arranged on the secondary part, or vice versa. The excitation magnets are designed as permanent magnets, electrical coils, or short-circuit windings. The magnetic-field-generating units can be designed as drive coils. Drive coils are electrical coils that are energized to generate an electromagnetic field by applying a coil voltage. However, the magnetic-field-generating units can also be designed as moving magnets (permanent magnets) in order to generate the electromagnetic field, for example as is described in EP 3 582 376 A1. Due to the interaction of the (electro)magnetic fields of the excitation magnets and of the magnetic-field-generating units, forces act on the secondary part, which forces move the secondary part relative to the primary part. The linear motor can be designed, for example, as a synchronous machine or as an asynchronous machine. The magnetic-field-generating units of the linear motor are arranged either along a direction of movement or in a plane of movement. The secondary part can be moved along this one direction of movement or freely in the plane of movement in two directions of movement. A distinction can also be made between short-stator linear motors and long-stator linear motors, whereas in the long-stator linear motor, the secondary part is shorter or smaller than the primary part and in the short-stator linear motor, the primary part is shorter or smaller than the secondary part.

The invention relates to long-stator linear motors which expressly include linear long-stator linear motors (with movement in a direction of movement) and planar long-stator linear motors (with movement in a plane of movement, often also called planar motor). In long-stator linear motors, a plurality of secondary parts are usually moved simultaneously and independently of one another along the primary part (in a direction of movement or in a plane of movement). Long-stator linear motors are therefore often used in electromagnetic transport systems in which a plurality of transport units (secondary parts) for carrying out transport tasks are moved simultaneously along a stator (primary part). The movements of the transport units can be independent of one another.

Long-stator linear motors are known from the prior art. In a long-stator linear motor, magnetic-field-generating units are arranged one behind the other in a direction of movement or in a plane of movement along a support structure. In the case of a planar motor, arrangements of the magnetic-field-generating units are also known in which magnetic-field-generating units are arranged on the stator in a plurality of planes, it being possible for the magnetic-field-generating units of one plane to be provided for one direction of movement. The magnetic-field-generating units arranged on the support structure form the stator of the long-stator linear motor, which stator extends in the movement space of the transport system. Excitation magnets, either permanent magnets or electromagnets, are arranged on a mover and generate a magnetic excitation field. In a transport system, the mover functions as a transport unit for moving an object, for example. If the drive coils are energized in the region of a mover, an electromagnetic drive magnetic field is generated which interacts with the excitation field of the excitation magnets to generate a driving force on the mover. The same can be achieved using the moving magnets as the magnetic-field-generating units with which the drive magnetic field is generated. By controlling the energization of the drive coils or the movement of the magnets, a moving drive magnetic field can be generated, by means of which the mover can be moved in the direction of movement or in the plane of movement of the long-stator linear motor. The advantage is that a large number of movers can be moved independently of one another on the stator simultaneously, it being possible to control the movements of the movers along the stator individually and independently of one another by means of a control. For this purpose, the magnetic-field-generating units can be controlled individually or in groups.

Due to the fact that the movers can be moved individually and independently of one another on the stator, providing collision avoidance is already known. The purpose of collision avoidance is to prevent an unwanted collision between two movers with overlapping movement paths, or between a mover and another part of the transport system, such as a part of a processing station provided on the transport system. Overlapping movement paths can result in a linear long-stator linear motor when two movers move in the same direction one behind the other or when two movers approach one another. Such collision avoidance can be found, for example, in EP 3 202 612 A1, the disclosure of which is expressly incorporated by reference herein in its entirety. For this collision avoidance, it is continuously checked whether a transport unit can perform a standstill maneuver with predetermined kinematics without running the risk of colliding with a transport unit driving ahead or with a stationary barrier. It can also be checked whether the movement of a mover can be changed by an adjustment maneuver so as to avoid a standstill maneuver.

EP 3 196 719 A2, the disclosure of which is expressly incorporated by reference herein in its entirety, also describes collision avoidance in a long-stator linear motor. In this case, a minimum collision avoidance distance is set for each mover and it is ensured that no other mover enters this collision avoidance distance.

The well-known collision avoidance strategies use the expansion of the movers in the direction of movement and knowledge of the current movement states (in particular position, speed, acceleration) of the movers in order to detect possible collisions with other movers in the surroundings and, if necessary, to intervene in the movements in order to avoid collisions. This also requires knowledge of possible movement limits of the movers, for example an acceleration limit (in the sense of deceleration and/or acceleration) or a speed limit, since these movement limits naturally limit the possible interventions in the movements of the movers and thus also the possibilities of reacting to potential collisions. A maximum possible deceleration, for example, has a significant influence on the possible braking distance of a mover. Such movement limits are configured in the control of the long-stator linear motor or in a collision avoidance of the control, and are therefore known.

However, when operating a transport system in the form of a long-stator linear motor, the movement limits might need to be changed. For example, it may be desirable to reduce the distances between movers driving one behind the other at the same speed in order to achieve a higher transport capacity. It may be necessary to adjust the acceleration limits so that collision avoidance can react to the shorter distances and, if necessary, avoid collisions. It can also happen that a mover has to brake more gently than before, for example because there was a change in the production system in which the transport system is integrated, or because the transported product changed. The transport system can also come to a stop, in which case it is often intended to stop with different movement limits than those predetermined in normal operation. In addition, there can of course be a multitude of other reasons for changing a movement limit of a mover in a transport system in the form of a long-stator linear motor.

Likewise, the dimensions of a mover can change during operation of the transport system, in particular the expansion in the direction of movement but also transversely thereto. This can happen, for example, when the mover is being loaded or unloaded with a product to be transported. If the dimensions are adjusted to the loading state, the distances between the movers can be kept to a minimum, as a result of which the transport capacity of the transport system can be increased or the utilization of a processing station can be increased. In addition, there can of course be a multitude of other reasons for changing the dimensions of a mover in a transport system.

However, such changes during operation are problematic because this can result in the collision avoidance recognizing a risk of a collision after the change and thus intervening in the movement of the movers. In the worst case, collision avoidance can also trigger an error reaction or an emergency stop of one or more movers, which is to be avoided during operation of the transport system. Such an emergency stop can, for example, simply propagate throughout the entire transport system and result in the entire transport system coming to a standstill.

SUMMARY

Therefore, embodiments allow a movement limit or a dimension of a mover to be changed safely in a transport system in the form of a long-stator linear motor during operation of the transport system.

In embodiments, if a new movement limit or anew dimension is specified for a first transport unit during operation of the transport system, before using the new movement limit as a collision movement limit or the new dimension as a collision dimension in the collision logic, it is checked whether the new movement limit or the new dimension results in a risk of collision with another, adjacent transport unit or a barrier of the transport system due to the predetermined collision logic, and, if no risk of collision is recognized, the new movement limit in the collision logic is used as a collision movement limit for the first transport unit or the new dimension in the collision logic is used as a collision dimension of the first transport unit. This prevents an unforeseen state of the transport system occurring as a result of a change in the collision dimensions or the collision movement limit, which change would trigger an undesired response from the collision monitoring system. The adoption of the changed collision dimension or the changed collision movement limit only takes place if no risk of collision is recognized.

If the check of the risk of collision is repeated at predetermined time intervals when a risk of collision is recognized for the adjacent transport units, it can be achieved that said adoption takes place as soon as the risk of collision is eliminated.

It is also advantageous to first change the movement of the first and/or the other transport unit in the event of a recognized risk of collision, so that, when using the new movement limit as a collision movement limit for the first transport unit or when using the new dimension as a collision dimension for the first transport unit, the risk of collision is eliminated and only then is the new movement limit in the collision logic used as a collision movement limit for the first transport unit, or the new dimension in the collision logic is used as a collision dimension of the first transport unit. If necessary, this allows an active intervention in the movements before the adoption of the changed collision dimension or the changed collision movement limit, in order to be able to carry out said adoption as quickly as possible.

In embodiments, a method for operating a transport system in the form of a long-stator linear motor having a plurality of transport units includes, during operation of the transport system: monitoring a predetermined collision logic that a distance between adjacent transport units or between a transport unit and a barrier is sufficiently large, so that, taking into account predetermined collision movement limits and predetermined collision dimensions of the transport units or the transport unit, a collision between the adjacent transport units or the transport unit and the barrier is preventable; and specifying a new movement limit or a new dimension for a first transport unit, and, before using the new movement limit as a collision movement limit or the new dimension as a collision dimension in the collision logic, checking whether the new movement limit or the new dimension results in a risk of collision with another, adjacent transport unit or a barrier of the transport system due to the predetermined collision logic. If no risk of collision is recognized, one of using the new movement limit in the collision logic as a collision movement limit for the first transport unit or using the new dimension in the collision logic as a collision dimension of the first transport unit.

According to other embodiments, the monitoring of the predetermined collision logic is a continuous monitoring of the predetermined collision logic.

In accordance with other embodiments, the method can further include repeating the check of the risk of collision at predetermined time intervals when a risk of collision is recognized for the adjacent transport units or the transport unit and the barrier.

According to still other embodiments, in the event of a recognized risk of collision, the method can further include changing movement of at least one of the first or the other transport unit, so that, when using the new movement limit as a collision movement limit for the first transport unit or when using the new dimension as a collision dimension for the first transport unit, the risk of collision is eliminated, and then using one of the new movement limit in the collision logic as a collision movement limit for the first transport unit or the new dimension in the collision logic a collision dimension of the first transport unit.

Embodiments are directed to a transport system in the form of a long-stator linear motor that includes a plurality of transport units, the movements of which are controllable. During operation of the transport system: a distance between adjacent transport units or between a transport unit and a barrier is continuously monitored to ensure that the distance is sufficiently large, so that, taking into account predetermined collision movement limits and predetermined collision dimensions of the transport units or the transport unit, a collision between the adjacent transport units or the transport unit and the barrier is preventable, and a new movement limit or a new dimension is specifiable for a first transport unit, and, before using the new movement limit as a collision movement limit or a new dimension as the collision dimension, the new movement limit or the new dimension is checked to determine whether the new movement limit or the new dimension results in a risk of collision with another, adjacent transport unit or a barrier of the transport system due to the predetermined collision logic. If there is no risk of collision, one of the new movement limit is adopted as the collision movement limit for the first transport unit or the new dimension in the collision logic is adopted as the collision dimension of the first transport unit.

According to other embodiments, in an event of a recognized risk of collision, the movement of at least one of the first or the other transport unit is changeable, so that, when using the new movement limit as a collision movement limit for the first transport unit or when using the new dimension as a collision dimension for the first transport unit, the risk of collision is eliminatable, and the new movement limit is usable as one of the collision movement limit for the first transport unit or the new dimension as a collision dimension of the first transport unit.

In accordance with still yet other embodiments, the transport system can further include at least one memory and at least one processor configured to execute at least one set of instructions stored in the at least one memory. A system control unit can be coupled to the at least one processor to control movements of the transport units. A collision control unit can be coupled to the at least one processor to execute collision logic to: continuously monitor the distance between the adjacent transport units or between the transport unit and the barrier so that, taking into account predetermined collision movement limits and predetermined collision dimensions of the transport units or the transport unit, a collision between the adjacent transport units or the transport unit and the barrier is preventable; and check the new movement limit or the new dimension to determine whether the new movement limit or the new dimension results in a risk of collision with another, adjacent transport unit or a barrier of the transport system due to the predetermined collision logic. The collision logic can also be executed to adopt one of the new movement limit as the collision movement limit for the first transport unit or the new dimension in the collision logic as the collision dimension of the first transport unit. Moreover, the system control unit, in the event of a recognized risk of collision, can change the movement of at least one of the first or the other transport unit, so that, when using the new movement limit as a collision movement limit for the first transport unit or when using the new dimension as a collision dimension for the first transport unit, the risk of collision is eliminated, and then the collision logic uses the new movement limit as one of the collision movement limit for the first transport unit or the new dimension as a collision dimension of the first transport unit.

Other exemplary embodiments and advantages of the present invention may be ascertained by reviewing the present disclosure and the accompanying drawing.

BRIEF DESCRIPTION OF THE DRAWINGS

In the following, the present invention shall be described in more detail with reference to FIG. 1 which, by way of example, shows schematic and non-delimiting advantageous embodiments of the invention. In the drawing:

FIG. 1 is an exemplary embodiments of a configuration of a transport system in the form of a linear long-stator linear motor.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The structure and the function of a long-stator linear motor are well known per se, which is why only a brief description is given below with reference to FIG. 1 and only to the extent necessary for understanding the invention. Although the invention is described with reference to a linear long-stator linear motor, the explanations also apply equally to a planar long-stator linear motor.

FIG. 1 shows a transport system 1 in the form of a linear long-stator linear motor having a usually stationary stator 2 (primary part of the motor) along which a large number n>1 of transport units T1 to Tn (secondary parts of the motor) can be moved. n is used here as an index and serves to make it easier to distinguish between the transport units Tn. Of course, the transport units Tn do not have to be of the same design, but can be different, in particular in terms of their dimensions or the movements that are possible with them.

The stator 2 can also consist of a plurality of transport paths P1, P2, with the transport units Tn being able to move on the various transport paths P1, P2. For this purpose, the transport paths P1, P2 can be connected to one another via switches W and a transport unit Tn can switch at a switch W1, W2 from one transport path P1, P2 to the other. A transport path P1, P2 can be a closed path or an open path. By arranging transport paths P1, P2 in a desired manner, transport systems 1 can be implemented very easily and flexibly with different movement spaces for the transport units Tn. The movement space is not limited to a plane (as in the simple example in FIG. 1), but can also extend freely in space.

Magnetic-field-generating units 3, for example in the form of drive coils but also as moving permanent magnets, are arranged along the stator 2. For reasons of clarity, only some of the magnetic-field-generating units 3 are shown in FIG. 1.

The stator 2 can also be constructed in the form of stator segments Sm, with a plurality of magnetic-field-generating units 3 being arranged on each stator segment Sm. The stator segments Sm are arranged side by side or one behind the other and can have different geometries, for example straight segments, different bends, switch segments, etc.

An excitation magnet 4, usually an arrangement of permanent magnets but also in the form of electromagnets, is arranged on each transport unit Tn, which excitation magnet generates an excitation magnetic field. To move the transport unit Tn, the excitation magnetic field of a transport unit Tn interacts with a drive magnetic field that is generated by magnetic-field-generating units 3 in the region of the transport unit Tn. The number of magnetic-field-generating units 3 used to generate the drive magnetic field is irrelevant. For example, driving voltages are applied to drive coils as magnetic-field-generating units 3 in order to generate the desired drive magnetic field. Alternatively, permanent magnets are moved as magnetic-field-generating units 3 in order to generate the desired drive magnetic field. In order to move the transport unit Tn, the drive magnetic field is moved in the direction of movement by appropriately controlling the magnetic-field-generating units 3. Through the interaction of the drive magnetic field and the excitation magnetic field, forces can be generated on a transport unit Tn in (or against) the direction of movement (in the case of a planar long-stator linear motor also in two directions in a plane of movement), but also forces normal to it can be generated. Such normal forces can be used in a switch W1, W2 to steer the transport unit Tn onto the desired transport path P1, P2, to guide the transport unit Tn on the stator 2 (e.g. a floating transport unit Tn of a planar long-stator linear motor) but also to hold a transport unit Tn on the stator 2. It can also be used to generate torques in all spatial directions on the transport unit Tn. This motor principle is well known.

An excitation magnet 4 can also be arranged on both sides of a transport unit Tn, as indicated in FIG. 1, in order to be able to interact with magnetic-field-generating units 3 on both sides of the transport unit Tn. This can be provided, for example, in a switch W1, W2. However, with this, the forces can also be increased in particular in the direction of movement.

A processing station 5 can also be provided along the stator 2 of the transport system 1 in order to process or manipulate a product 6 transported with a transport unit Tn. The product 6 can remain on the transport unit Tn during processing, and the transport unit Tn can be stopped or moved during processing. However, the product 6 can also be removed from the transport unit Tn for processing and, after processing, placed back on the transport unit Tn or another transport unit for onward movement. A transfer station 7 can also be provided independently of a processing station 5, in order to place a product 6 on a transport unit Tn for onward transport in the transport system 1 (e.g. for feeding the products into the transport system 1) and/or to remove a product 6 from a transport unit Tn (for example after processing has been completed). A handling device 8, for example a robot, can be provided for this purpose. The products 6 can be placed or removed when the transport unit Tn is stationary or when the transport unit Tn is moving.

A system control unit 10 is provided for controlling the movement of the transport units Tn of the transport system 1. The system control unit 10 controls in particular the magnetic-field-generating units 3 in order to implement the desired movements of the transport units Tn. The desired movements of the transport units Tn are usually predetermined, for example based on a movement planning. At each time step, usually in the 10 or 100 ms range, of the control of the movements of the transport units Tn, a movement setpoint value, for example a setpoint position or a setpoint speed, is known for each transport unit Tn, from which setpoint position/setpoint speed the system control unit 10 determines control signals which are then effected by the magnetic-field-generating units 3 which interact with the corresponding transport unit Tn. A control signal is, for example, a coil voltage of a drive coil which can then be generated by power electronics and applied to the drive coil. To determine the control signals, the current positions of the transport units Tn on the stator 2 can also be determined, for example as actual positions of the transport units Tn, and made available to the system control unit 10 for controlling the movements. For this purpose, position sensors can also be arranged along the stator 2 in a well-known manner in order to detect the positions of the transport units Tn.

The system control unit 10 can also be designed as a distributed control having a plurality of control units that work together. For example, a plurality of segment control units 11 are provided, which are responsible for a specific portion of the stator 2. The individual segment control units 11 can also be connected to one another, for example via a data bus 12 as in FIG. 1, in order to be able to interchange required data. In addition to segment control units 11, the system control unit 10 can also comprise a higher-level control unit 13 in which, for example, the setpoint values for the movements of transport units Tn are generated and in which a collision logic 14 can also be implemented to avoid collisions between transport units Tn. However, such a collision logic 14 can also be implemented in an independent collision control unit 15 (as in the example in FIG. 1), which control unit can also be connected to other control units of the system control unit 10 via the data bus 12, for example. The collision control unit 15 can be part of the system control unit 10. Other components of the transport system 1 can also be connected to the system control unit 10 via the data bus 12, for example a control unit of the handling device 8 (as indicated by dashed lines in FIG. 1) or a control unit of a processing station 5.

A control unit (e.g. system control unit, segment control unit, higher-level control unit, collision control unit, control unit of the handling device or processing station) is usually implemented as microprocessor-based hardware, for example as a computer, microcontroller, programmable logic controller, etc. Appropriate control software is executed in a known manner on the microprocessor-based hardware in order to achieve the desired functionality. The hardware can have appropriate interfaces in order to implement the desired functionality. However, an embodiment of a control unit as an integrated circuit is also conceivable, for example as a field programmable gate array (FPGA) or an application-specific integrated circuit (ASIC). Mixed forms are conceivable as well.

The collision logic 14, usually in the form of collision software, of the system control unit 10 uses predetermined, for example programmed or configured, criteria to check whether there is a risk that a transport unit Tn will collide with an adjacent transport unit Tn-1 or a barrier B of the transport system 1 due to its movement. An adjacent transport unit Tn-1 can be a transport unit Tn-1 (the direction of movement of which is irrelevant) driving in front or behind the transport unit Tn (in particular in the case of a linear long-stator linear motor, but also in the case of a planar long-stator linear motor), or a transport unit Tn-1 driving next to it (in particular in the case of a planar long-stator linear motor, or in the region of a switch W). A barrier B of the transport system 1 can, for example, be a part that blocks a movement path of the transport unit Tn. An example of this is a door at a processing station 5 which is closed when another transport unit Tn is inside. An open door, on the other hand, would not be a barrier B. However, a barrier B can only exist logically in the system control. For example, such logical barriers B can be used to block the entry into a switch region for other transport units when a transport unit Tn is currently in the switch W. However, such a logical barrier B can also be used to implement regions with a speed limit or acceleration limit. In this case, a barrier B prevents, for example, a transport unit Tn from entering the region of the speed limit at a speed that is above a defined maximum speed.

The collision logic 14 checks in particular the distance A in the direction of movement (in the case of a planar motor also in both directions of movement or in the region of a switch W also transverse to the direction of movement) between adjacent transport units Tn, Tn-1 or between a transport unit Tn and a barrier B and assesses whether the distance A is sufficient to change the movement of a transport unit Tn, Tn-1 in the event of an error in order to avoid a collision. The change in movement can be implemented, for example, by stopping the transport unit Tn, Tn-1 with a predetermined maximum deceleration (acceleration limit), or by reducing the current speed to a predetermined lower speed with a predetermined deceleration. Other changes in the movement are also quite conceivable, for example a change in direction on a planar long-stator linear motor. For this purpose, a collision distance K in the direction of movement (in the case of a planar motor also in both directions of movement or in the region of a switch W also transversely to the direction of movement) can be predetermined between two adjacent transport units Tn, Tn-1 or between a transport unit Tn and a barrier B, which distance must not be undershot, because otherwise the movement can no longer be adjusted in order to avoid a collision.

The distance A results from the collision dimensions of the transport unit Tn, Tn-1 and the current positions of the adjacent transport units Tn, Tn-1 on the stator 2. The current positions can be positions determined using position sensors, but can also be positions determined in the system control unit 10, or simply also be predetermined setpoint values for positions. The collision dimensions result from the geometries of the transport units Tn, Tn-1. In the embodiment according to FIG. 1, the collision dimensions are given by the length L and the width b of a transport unit Tn, Tn-1. The collision dimensions can be real values which result directly from the geometry of the corresponding transport unit Tn, Tn-1, but can also only be logical values, for example by lying a simple geometric FIGURE defining the collision dimensions (e.g. a rectangle) around the transport unit Tn, Tn-1, which FIGURE surrounds at least the regions of the transport unit Tn, Tn-1 that are relevant for collisions. This can make the calculation of the distance A easier. On straight stretches of a long-stator linear motor, the collision dimension in the direction of movement may be sufficient to determine the distance A. In curves, or also in the switches W, the collision dimension transverse to the direction of movement can also be important, because a transport unit Tn, Tn-1 can deflect at the ends in a curve and the distance can decrease radially inward. The collision dimensions of a transport unit Tn, Tn-1 required for the collision logic 14 can in any case be assumed to be known.

A collision distance K and a distance A, as well as the positions, are of course related to a specific reference point of the transport unit Tn, Tn-1, for example a center (as in FIG. 1) or a front or rear (each viewed in the direction of movement) end of a transport unit Tn, Tn-1.

The collision distance K depends on the current state of movement, in particular speed and acceleration, of the transport unit Tn, Tn-1. The collision distance K is to be selected or predetermined in such a way that a collision can be avoided by intervening in the movements of the adjacent transport units Tn, Tn-1 or the transport unit Tn (in the case of a barrier B). The predetermined collision movement limit also plays an important role in determining the collision distance K, because this determines how the movements of the transport units Tn, Tn-1 can be intervened, for example braked with a maximum deceleration (acceleration limit) or accelerated to a maximum speed (speed limit), possibly with a maximum acceleration. The collision distance K can be configured, but can also be continuously adjusted during operation, for example by the collision logic 14.

Therefore, during operation of the transport system 1, a predetermined collision logic 14 continuously monitors that a distance A between transport units Tn, Tn-1 adjacent on the stator 2 or between a transport unit Tn and a barrier B is sufficiently large in order to be able to prevent a collision between the adjacent transport units Tn, Tn-1 or the transport unit Tn with the barrier B, taking into account predetermined collision movement limits and given collision dimensions of the transport units Tn, Tn-1. The collision movement limits determine how the movement of a transport unit Tn, Tn-1 can be changed if necessary, i.e. for example the maximum deceleration with which braking can take place. This check takes place in a time step of the collision control, usually in the 10 to 100 ms range, with the time step of the collision control preferably corresponding to the time step of the regulation of the movements of the transport units Tn.

The collision distance K can be determined once for predetermined boundary conditions (collision movement limits, collision dimensions, transport unit(s) Tn, Tn-1 involved) and no longer changes if the boundary conditions remain the same. The collision distance K can be different for different combinations of transport units Tn, Tn-1, but this does not change the basic procedure. If the boundary conditions change, the collision distance K can be determined anew. This can be done by simple kinematic calculations.

Since the collision distance K depends on the collision dimensions and the collision movement limits of the transport unit(s) Tn, Tn-1 involved, a change in the collision dimensions or the collision movement limits can result in unexpected states on the transport system 1. In the worst case, this results in collisions or in an emergency stop of part or even the entire transport system 1. This is explained using the following striking examples, although there may be other examples as well.

The collision dimension of a transport unit Tn is increased in the direction of movement, for example because a specific product 6 is placed on the transport unit Tn, and this product extends beyond the front edge of the transport unit Tn, as indicated by dashed lines on the transport unit T1 in FIG. 1. This would result in a reduced distance A from the transport unit Tn-1 driving ahead in the same direction of movement or to a barrier B in front of it or to a transport unit Tn-1 driving toward the transport unit Tn, because the distance A depends on the collision dimension. The collision distance K between the two transport units Tn, Tn-1 or to a barrier B can be undershot in this case.

The collision dimension of a transport unit Tn is increased against the direction of movement, for example because a specific product 6 is placed on the transport unit Tn. This would result in a reduced distance A to the transport unit Tn-1 driving behind or to a barrier B laying behind it or to a transport unit Tn-1 driving away from the transport unit Tn, because the distance A depends on the collision dimension. The collision distance K between the two transport units Tn, Tn-1 or to a barrier B can be undershot in this case.

The same situations can occur, in particular in the case of a planar long-stator linear motor, if the product 6 laterally projects (as also indicated in FIG. 1). The lateral enlargement can also result in a reduced distance A in a curve or switch W of a linear long-stator linear motor.

The maximum deceleration of a transport unit Tn is increased. The distance A from an adjacent transport unit Tn-1 can thus become too small, for example if the transport unit Tn driving ahead is braked with this increased maximum deceleration.

The maximum deceleration of a transport unit Tn is reduced. The distance A from a transport unit Tn-1 driving ahead can thus become too small, for example if the transport unit Tn is braked with this reduced maximum deceleration, as a result of which the braking distance is lengthened. The same applies in the case of a barrier B, where the distance A to the barrier can become too small.

In principle, a problem in collision avoidance can arise in particular when a braking distance of a transport unit Tn driving ahead becomes shorter due to a change in a movement limit, or when a braking distance of a transport unit Tn driving behind becomes longer.

In order to avoid such situations when a new movement limit or a new dimension is specified for a transport unit Tn during operation of the transport system 1, the procedure is as follows. It is checked whether the new movement limit or dimension results in a risk of collision with an adjacent transport unit Tn-1 or with a barrier B. This can be a transport unit Tn-1 driving ahead, driving behind, or driving in the opposite direction. In the case of a planar long-stator linear motor, both directions of movement must of course be checked. However, the new movement limit or the new dimension are initially only stored in the system control unit 10 but are not immediately adopted by the collision logic 14. The collision logic 14 checks whether a risk of collision with another transport unit Tn-1 or with a barrier B is recognized with the new movement limit as a collision movement limit for the first transport unit Tn or with the new dimension as a collision dimension of the first transport unit Tn. This can easily be done using the criteria predetermined in the collision logic 14 for checking a risk of collision, with the new dimension or the new movement limit being assumed for this check, for example for determining a distance A or a collision distance K. If no risk of collision is recognized, the new movement limit is adopted as a new collision movement limit for this transport unit Tn or the new dimension is used as a collision dimension for this transport unit 14 and is used in the collision logic 14 from this time on (until a possible new change).

As long as the new dimension or new movement limit has not been adopted, this check can be repeated, for example at each time step of the check, until the new dimension or new movement limit can be adopted. If nothing changes in the movements of the adjacent transport units Tn, Tn-1, then it can happen that the new dimension or the new movement limit is not adopted at all. However, this case is unlikely, in particular in the case of transport systems 1 with long or multiple movement paths P1, P2 and many transport units Tn.

If the system controller 10 allows it, an attempt can also be made to change the movement of at least one of the adjacent transport units Tn, Tn-1, so that an adoption of the new dimensions or the new movement limit is possible.

If a risk of collision is recognized by the collision logic 14, the movement of the transport unit Tn and/or, if necessary, the adjacent transport unit Tn-1 can therefore first be changed, so that, when using the new movement limit as a collision movement limit for the first transport unit Tn or when using the new dimension as a collision dimension, the risk of collision is eliminated. The new movement limit is only used as a collision movement limit for the first transport unit Tn, or the new dimension is used as a collision dimension of the first transport unit Tn, in the collision logic 14 for collision avoidance when this adjustment of the movement means that no more risk of collision is recognized.

This check of a risk of collision can be carried out by the collision logic 14 in each time step of the collision control, or also in longer time intervals (for example integer multiples of the time step of the collision control).

In the event of a change in a collision dimension of a transport unit Tn, in particular in the event of an increase, it can be advantageous if the change is made in the system control unit 10 before the actual change is made on the transport system 1, i.e. before a product 6 is actually placed on the transport unit Tn, for example. It can thus be achieved that the collision logic 14 is already working with the new collision dimension at the time of the actual change on the transport system 1.

The change in a collision dimension or a collision movement limit of a transport unit Tn can be initiated by a user, but can also be done from the system control unit 10, for example a higher-level control unit 13. For example, the user can easily adjust a safety distance between transport units Tn, Tn-1 or to a barrier B via the collision dimension. A change from the system control unit 10 could occur if a movement command for a transport unit Tn is replaced by another movement command with different collision movement limits.

At least one memory (not shown), e.g., a non-transitory computer readable medium or media, can be provided to store one or more sets of instructions, as well as collision logic 14, that can be executed by one or more processors of a control unit, including system control unit 10, segment control unit 11, higher-level control unit 13, collision control unit 15, and/or a control unit of the handling device or processing station, to perform any of the methods or computer based functions disclosed herein, either alone or in combination with the other described devices. The at least one memory, accessible by the processors, can be part of the control unit or remote from the control unit, e.g., a remotely located server, memory, system, or communication network or in a cloud environment.

Moreover, in addition to the foregoing, it is to be understood and those skilled in the art will readily appreciate that the blocks and/or modules illustrated in FIGURE can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. Further, these blocks and/or modules can be formed by analog instrumentation, e.g., analog electric/electronic circuits, analog computers, analog devices, etc., and/or can be formed as application specific integrated circuits (ASICs) or other programmable integrated circuits, and, in the case of the blocks and/or modules, which can be implemented by microprocessors or similar, they may be programmed using software (e.g., microcode) to perform various functions discussed herein and may optionally be driven by firmware and/or software. Alternatively, each block and/or module may be implemented by dedicated hardware, or as a combination of dedicated hardware to perform some functions and a processor (e.g., one or more programmed microprocessors and associated circuitry) to perform other functions.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for operating a transport system in the form of a long-stator linear motor having a plurality of transport units, the method comprising:
    during operation of the transport system:
    monitoring a predetermined collision logic that a distance between adjacent transport units or between a transport unit and a barrier is sufficiently large, so that, taking into account predetermined collision movement limits and predetermined collision dimensions of the transport units or the transport unit, a collision between the adjacent transport units or the transport unit and the barrier is preventable; and
    specifying a new movement limit or a new dimension for a first transport unit, and, before using the new movement limit as a collision movement limit or the new dimension as a collision dimension in the collision logic, checking whether the new movement limit or the new dimension results in a risk of collision with another, adjacent transport unit or a barrier of the transport system due to the predetermined collision logic; and
    if no risk of collision is recognized, one of using the new movement limit in the collision logic as a collision movement limit for the first transport unit or using the new dimension in the collision logic as a collision dimension of the first transport unit.

2. The method according to claim 1, wherein the monitoring of the predetermined collision logic is a continuous monitoring of the predetermined collision logic.

3. The method according to claim 1, further comprising repeating the check of the risk of collision at predetermined time intervals when a risk of collision is recognized for the adjacent transport units or the transport unit and the barrier.

4. The method according to claim 1, wherein, in the event of a recognized risk of collision, the method further comprises changing movement of at least one of the first or the other transport unit, so that, when using the new movement limit as a collision movement limit for the first transport unit or when using the new dimension as a collision dimension for the first transport unit, the risk of collision is eliminated, and then using one of the new movement limit in the collision logic as a collision movement limit for the first transport unit or the new dimension in the collision logic a collision dimension of the first transport unit.

5. A transport system in the form of a long-stator linear motor comprising:
    a plurality of transport units, the movements of which are controllable,
    wherein, during operation of the transport system:
    a distance between adjacent transport units or between a transport unit and a barrier is continuously monitored to ensure that the distance is sufficiently large, so that, taking into account predetermined collision movement limits and predetermined collision dimensions of the transport units or the transport unit, a collision between the adjacent transport units or the transport unit and the barrier is preventable, and
    a new movement limit or a new dimension is specifiable for a first transport unit, and, before using the new movement limit as a collision movement limit or a new dimension as the collision dimension, the new movement limit or the new dimension is checked to determine whether the new movement limit or the new dimension results in a risk of collision with another, adjacent transport unit or a barrier of the transport system due to the predetermined collision logic, and
    wherein, if there is no risk of collision, one of the new movement limit is adopted as the collision movement limit for the first transport unit or the new dimension in the collision logic is adopted as the collision dimension of the first transport unit.

6. The transport system according to claim 5, wherein, in an event of a recognized risk of collision, the movement of at least one of the first or the other transport unit is changable, so that, when using the new movement limit as a collision movement limit for the first transport unit or when using the new dimension as a collision dimension for the first transport unit, the risk of collision is eliminatable, and the new movement limit is usable as one of the collision movement limit for the first transport unit or the new dimension as a collision dimension of the first transport unit.

7. The transport system according to claim 5, further comprising at least one memory and at least one processor configured to execute at least one set of instructions stored in the at least one memory;
    a system control unit coupled to the at least one processor to control movements of the transport units;
    a collision control unit coupled to the at least one processor that executes collision logic to:

continuously monitor the distance between the adjacent transport units or between the transport unit and the barrier so that, taking into account predetermined collision movement limits and predetermined collision dimensions of the transport units or the transport unit, a collision between the adjacent transport units or the transport unit and the barrier is preventable; and check the new movement limit or the new dimension to determine whether the new movement limit or the new dimension results in a risk of collision with another, adjacent transport unit or a barrier of the transport system due to the predetermined collision logic, wherein the collision logic is executed to adopt one of the new movement limit as the collision movement limit for the first transport unit or the new dimension in the collision logic as the collision dimension of the first transport unit.

8. The transport system according to claim 7, wherein the system control unit, in the event of a recognized risk of collision, changes the movement of at least one of the first or the other transport unit, so that, when using the new movement limit as a collision movement limit for the first transport unit or when using the new dimension as a collision dimension for the first transport unit, the risk of collision is eliminated, and then the collision logic uses the new movement limit as one of the collision movement limit for the first transport unit or the new dimension as a collision dimension of the first transport unit.

* * * * *